Aug. 5, 1941.  E. G. CROFOOT ET AL  2,251,623
SPEEDOMETER
Filed Aug. 19, 1937   2 Sheets-Sheet 2
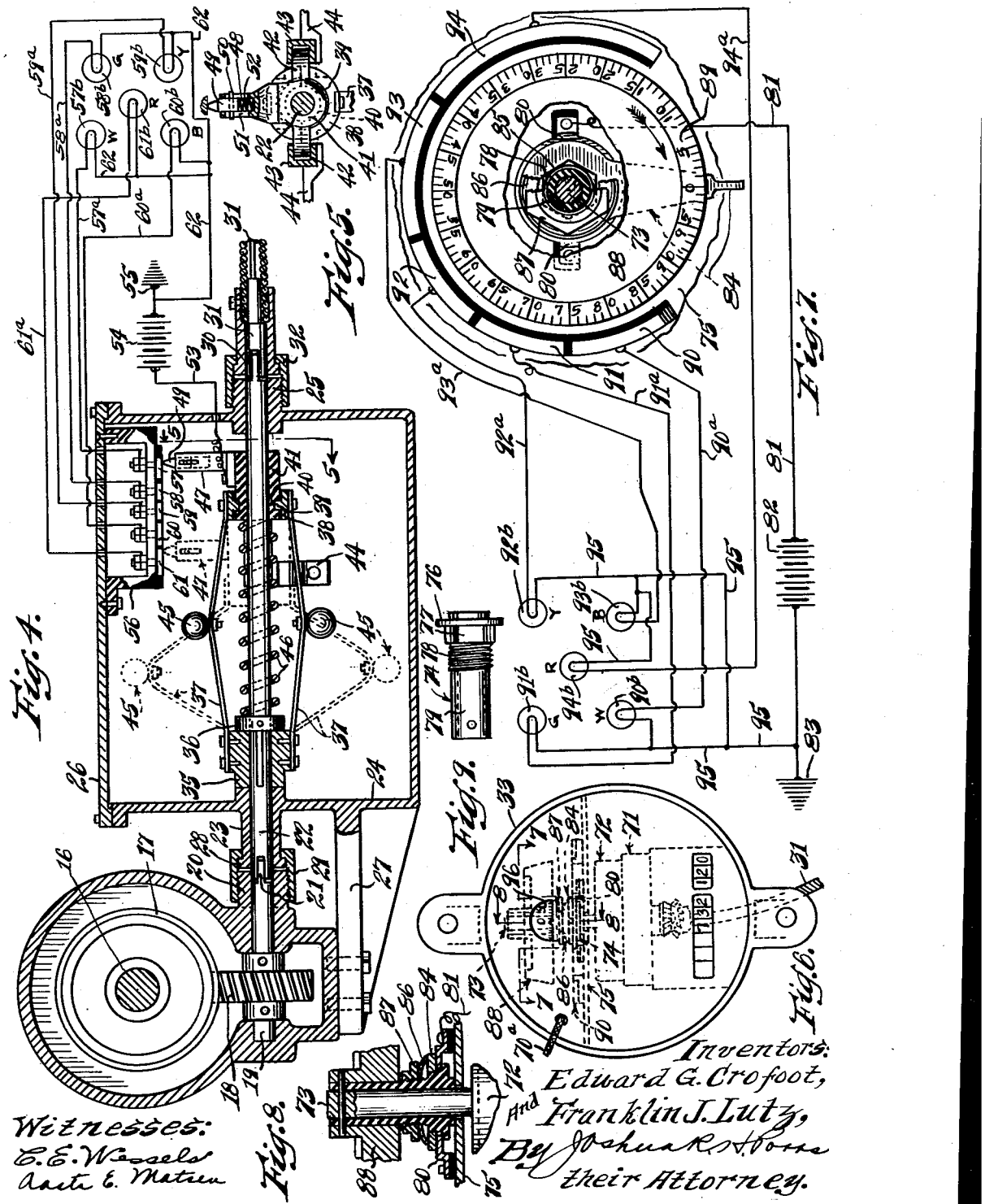
Witnesses:
C. E. Wessels
Aarte E. Matsen
Inventors:
Edward G. Crofoot,
And Franklin J. Lutz,
By Joshua R. H. Potts
their Attorney.

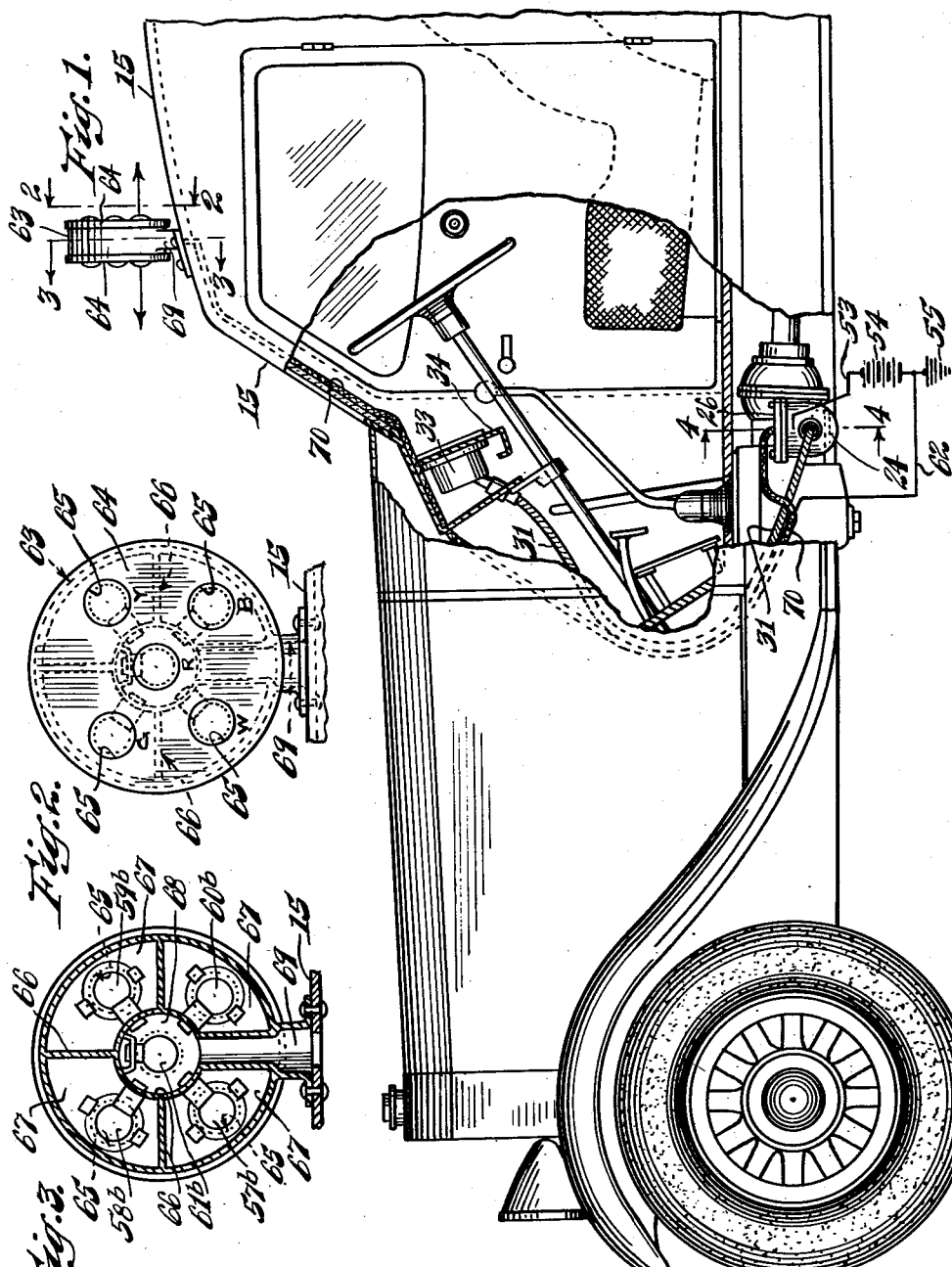

Patented Aug. 5, 1941

2,251,623

UNITED STATES PATENT OFFICE 2,251,623

SPEEDOMETER

Edward G. Crofoot and Franklin J. Lutz, Park Ridge, Ill.

Application August 19, 1937, Serial No. 159,864

4 Claims. (Cl. 177—311.5)

This invention relates to improvements in speedometers, and more particularly, it has for an object the provision of means for indicating the speed of a vehicle to persons outside the vehicle, such as persons driving a car in an opposite direction.

It is understood that particularly at night it is difficult to judge the speed of cars coming in opposite directions, and this results in many collisions between cars, especially with drivers of cars trying to pass cars ahead of them, colliding with cars coming in an opposite direction. Many of these collisions, it will be understood, could be avoided if the drivers of cars contemplating passing cars ahead had any particular means of learning the speed of cars coming in the opposite direction, as in many cases where accidents have occurred, if the drivers doing the passing had realized how fast the opposing cars were coming, they would not have attempted to pass.

One of the objects of this invention is to give greater information and warning to the drivers of vehicles as to speed at which cars coming in the opposite direction are traveling. We have provided means consisting of a system of lights of various colors by which accurate information can be instantly had by drivers of other vehicles as regards to the speed of the vehicles. For example, referring to our invention, if a vehicle is traveling at a speed of more than sixty miles per hour, a red light will be lighted which will be visible far enough away to give the proper warning. Also, for example, if the car is traveling very slowly, at a speed of fifteen to twenty-five miles per hour, a while light would be lighted to give that information to drivers of other vehicles. Various other speeds are indicated by other colored lights.

It will be also understood that this invention is not limited to automobiles but is applicable to all kinds of vehicles, such as trains and airplanes.

Another object has been to provide such a system so that it may be easily installed and applied to a standard make of car without requiring much workmanship or great rearrangement of construction.

Another object has been to provide such means in effective form at a low cost.

Other objects and advantages will appear at once from the following description, reference being had to the accompanying drawings, wherein:

Fig. 1 is an elevation of the front part of a vehicle, partly broken away, illustrating one form of applying the principles of our invention;

Fig. 2 is an elevation of a signal light housing of the form illustrated, taken on the line 2—2 of Fig. 1;

Fig. 3 is a sectional elevation of the signal light housing taken on the line 3—3 of Fig. 1;

Fig. 4 is a sectional view taken on the line 4—4 of Fig. 1, showing the central mechanism for the signal lights;

Fig. 5 is a detail view, taken on the line 5—5 of Fig. 4, partly broken away, showing part of the mechanism for operating the different contacts for the different lights;

Fig. 6 is a face view of a speedometer of another form of our invention with the operating mechanism indicated therein in dotted lines;

Fig. 7 is a plan view of the operating mechanism for the same with a wiring diagram, with certain parts broken away, taken substantially on the line 7—7 of Fig. 6;

Fig. 8 is an enlarged sectional view taken on the line 8—8 of Fig. 6; and

Fig. 9 is a detailed view of the bushing of Fig. 8.

Referring more particularly to the drawings, and especially to the form shown in Figs. 1-5, there is shown in the form illustrated, a part of a vehicle 15, having the usual drive shaft 16 with the usual speedometer worm gear 17 operating a pinion gear 18 on a stud shaft 19 mounted in the transmission housing. One end of the stud shaft 19 extends through a threaded hub 20 and is splined at 21 to an intermediate shaft 22 which is interposed to operate a signal light control mechanism of the form shown in Figs. 1-5.

The shaft 22 is mounted in bearings 23 and 25 integral with the housing 24. The usual housing 24, as shown, is provided with a cover plate 26 secured by bolts, and the housing 24 has a bracket 27 secured to the transmission housing by bolts. The bearing 23 has a circular flange 28, as clearly shown in Fig. 4, and is locked to the hub 20 by a cap flanged retaining sleeve or ring 29.

Intermediate shaft 22 is splined, as at 30, to the usual flexible speedometer shaft 31 and they are locked together by the threaded cap 32.

This intermediate shaft 22, as will be explained hereafter in the form shown in Figs. 6-9, can be dispensed with in that form and the shaft 31 can be connected directly to the shaft 19 as will appear more fully in connection with the description of that form.

Flexible shaft 31 may be connected to the usual speedometer 33 on the dash board 34.

Mounted in the housing 24 is the governor control mechanism by means of which the different lights to be utilized are selected. A hub 35 is keyed to shaft 22 and is locked in position against lateral movement, that is, axial or longitudinal movement relative to the shaft 22, by means of a collar 36. Secured to the hub 35 are a pair of flexible spring ball carrying arms 37, at one end of each arm thereof. The ball carrying arms 37, at their other ends are connected to a circular ring member 38, having a bead or internal key flange 39 which revolves in a groove 40 in a sliding or reciprocating sleeve 41 made of insulating material, shown in Fig. 4. The reciprocating sleeve 41, it is understood, is adapted to reciprocate back and forth to allow free play at one end to the ball carrying arms 37 of the governor, along the line of the shaft 22. The circular ring member 38 is adapted to revolve around the reciprocating sleeve 41 so as to permit the revolving movement of the arms and balls of the governor.

A pair of horizontal arms 42, as clearly shown in Fig. 5, is provided to guide the sleeve 41 and prevent it from turning on the shaft 22. The arms are slidable in channel members 43 secured by brackets 44 through the housing 24. Arms 37 have ball weights 45, as will be readily understood.

A suitable coil spring 46 is mounted on the shaft 22 between collar 36 and sleeve 41 to properly position the reciprocating sleeve 41 so as to control the movement of the governor, that is, to insure a neutral position of the control mechanism, as will be clearly understood hereinafter, and also to regulate the movement of the governor.

Secured upon the upper portion of the insulating reciprocating sleeve 41 is an electrical conductor post 47 having a central bore 48. Vertically slidable in this bore is a contact plunger 49, as clearly shown in Fig. 4, the top of which may be slightly tapered. The plunger is provided with a pin 50 which fits into opposed vertical slots 51 in the hollow post 47. This arrangement of the pin and the slots prevents rotation of the plunger but permits the plunger to slide vertically in the bore 48 in the post 47. Located also in the bore beneath the plunger is a spring 52 tending to keep the plunger in an upward contact condition and to allow for wear of the contact point.

Having reference to electrical connections, as shown in Fig. 4, post 47 has a wire 53 leading from it to the battery 54, which battery is grounded as at 55. Secured to the underside of the cover 26 of the housing 24 and superposed above the contact post 47 is a U-shaped insulated bracket 56 which supports a plurality of conductor plates 57, 58, 59, 60 and 61. These plates are insulated from each other and are respectively connected by wires 57a, 58a, 59a, 60a and 61a to light bulbs as 57b, white, 58b, green, 59b, yellow, 60b, blue and 61b, red, as clearly shown in Fig. 4. The white bulb 57b and its corresponding conductor plate 57 are intended for use when a car is traveling at from fifteen to twenty-five miles an hour. The green light 58b and conductor plate 58 are intended, in the form shown, for use when traveling from between twenty-five and thirty-five miles per hour. Similarly, the yellow bulb 59b with its conductor plate 59 is intended for use in the thirty-five to forty-five mile zone, then bulb 60b with its conductor plate 60 may be used in the forty-five to sixty mile zone. The red bulb 61b with its conductor plate 61 may be used for speeds exceeding sixty miles per hour. It will be understood that these mileage figures are purely arbitrary and may be changed.

Each bulb is connected by one of the wires 62 to the battery.

With respect to the portion of the apparatus that is visible to persons in other cars, there is provided on the top of the cab or other suitable place so as to be readily visible in front and back a light housing 63 provided with a pair of removable face plates 64, as clearly shown in Figs. 1, 2 and 3, each plate having five light emitting apertures 65, there being one light emitting aperture for each bulb, as will be readily understood. The light housing 63 in the form shown is provided with partitions 66 forming four radial compartments 67 and a central compartment 68. Terminal opening 69 is also formed in a hollow standard or post on the top of car 15 or otherwise for connecting cable 70 of wires from the various parts to the lights.

The method of operation will be readily understood. The shaft 22 will be rotated from the transmission which will cause the governor to be operated with the balls whirling farther or lesser apart, depending on the speed of the vehicle.

Looking at Fig. 4, the faster the shaft rotates and car moves, the faster the balls will whirl and the farther apart they will be, and the more to the left will the reciprocating sleeve be pulled, whereas, when the contrary is the case the reciprocating sleeve will be pushed by the spring correspondingly to the right. When the car is not moving it will be understood that the coil spring 46 will position the reciprocating sleeve against or close to the integral hub 25 and in that condition the contact plunger 49 will not be in contact with any of the conductor plates but will be in contact with the insulation, hence there being no circuit, none of the lights will be lighted. When the car starts the governor will operate to draw the reciprocating sleeve 41 to the left whereupon the plunger 49 will pass from the insulation on to the conductor plate 57 and close a circuit to light bulb 57b which will cause the white light to light, thus indicating on the top of the car to persons outside the car that the vehicle is traveling in the fifteen to twenty-five miles zone, as shown in Fig. 1.

As the car speeds up, the reciprocating sleeve 41 will move farther to the left, as seen looking at Fig. 4, and the plunger 49 will pass to the conductor plate 58 whereupon another circuit will be made with green light bulb 58b which will indicate to persons outside the car that the speed is within the twenty-five to thirty-five mile zone. The operation with respect to conductor plate 59, 60 and 61 is similar and will be understood without further explanation, except, when a speed of over sixty miles an hour is reached the plunger will have moved to the extreme left, looking at Fig. 4, and completed a circuit with the red bulb 61b. This bulb, in the form shown, has been placed in the center. It will be understood, of course, that no lights will be lit when the car is standing still or when the car is not traveling at a speed as much as fifteen miles an hour; as stated this is arbitrary and of course, the invention is not limited by any particular arrangement but may be expressed in many other arrangements.

It will also be understood that at most there will only be one light lit at a time. It will also be understood, of course, that the usual speedometer will be used inside the car on the dash board for the driver and will correspond to the speed indicator outside the car for use for persons outside the car.

Referring now to the form shown in Figs. 6, 7, 8 and 9, the arrangement in the housing 24 which was described in connection with form shown in Fig. 4 is omitted. Instead, the flexible shaft 31 is connected directly to the shaft 19 by cap 32, which is screwed on the threaded hub portion 20. The other end of the flexible shaft 31 is shown connected to the usual speedometer 33.

We have shown the flexible shaft applied to a common form of means translating revolving motion into oscillatory motion. For example, referring to Fig. 6, there is shown the flexible shaft 31 connected to a permanent revolving magnet 71 which operates an armature 72 on armature shaft 73 in a well known manner. The armature may be provided with a common spring or other means for effecting the oscillatory motion of the armature. However, any suitable means may be used for translating the revolving motion into the oscillatory motion, where oscillatory motion is desired. Because of the construction referred to in Fig. 6 for translating revolving motion into oscillating motion, it is felt that little more is necessary than to indicate the same, as it will be readily understood by the worker skilled in the art.

Referring more particularly to the means which we have invented for making the contacts and controlling the selection of lights in the form shown in Figs. 6 to 9, an insulating bushing 74, clearly shown in Fig. 9, is sleeved on the armature shaft 73, as clearly shown in Fig. 8, to rest on a supporting plate 75. The bushing has a flange 76, a hexagonal portion 77, a threaded portion 78, and a cylindrical surface 79. A circular apertured contact plate 80 is secured to and insulated from supporting plate 75 and the plate 80 is connected by a wire 81, as shown in Fig. 7, to a battery 82, and the battery is grounded at 83. Contact arm 84, with a hexagonal aperture 85 registers with and fits over the hexagonal portion 77 of the bushing 74 and the contact arm 84, is maintained in contact with the circular apertured contact plate 80 by means of a disk spring 86, clearly shown in Fig. 8. The disk spring 86 is compressed by a lock nut 87 to maintain pressure, the lock nut 87 being threaded upon the threaded portion 78 of the bushing 74. The lock nut 87 may be adjusted to vary the tension of the spring on the contact arm 84. Also maintained on the bushing 74 is a dial 88 with the usual speed chart 89.

While the contact arm in the form shown (see Fig. 7) is registering at zero, as the speed increases, it will be readily understood, that the arm 84 and the chart 89 will move in a clockwise direction.

Supported and insulated from the plate 75 are a plurality of conductor plates 90, 91, 92, 93, and 94 which are also insulated from each other as well as from the plate 75. The plates 90-94 are connected respectively by wires 90a-94a to lights 90b-94b, respectively, in the same way that the conductor plates of the first form were related to the lights of the first form. The lights 90b-94b are equipped with return wires 95 to the battery.

The lights are located on the top of the cab similarly to those shown in the first form and are similarly provided with a housing arrangement like that of the first form, the wires being led to the housing from the parts by a cable 70a.

The method of operation of the form shown in Figs. 6-9 will be readily understood. The transmission will drive the flexible shaft 31 which will rotate the permanent magnet 71 which will oscillate the armature shaft 73 to oscillate the contact arm 84 and the dial 89. The faster the flexible shaft will revolve, the greater will be the clockwise movement of both the contact arm and the dial, as shown, looking at Figs. 6 and 7. Viewing Fig. 7, it will be seen that no speed is being registered through the opening 96 through which the dial is read, as shown in Fig. 6, that is, on the speedometer 33, which is used by the driver of the car. Also, the contact arm 84 is registering at zero although not seen in practical use. When the car is not being operated the contact arm 84 will not be in contact with any of the conductor plates 90, 91, 92, 93 and 94. In the form shown in Fig. 7 the contact arm 84 will not make a contact with conductor plate 90 until a speed of fifteen miles is reached, at which time a circuit will be completed with the white light to indicate speed in the fifteen to twenty-five mile zone. As the speed of the car increases, it will be understood that the contact 84 will contact the conductor plate 91 to operate the green light to indicate a speed of twenty-five to thirty-five miles. Similarly, further speed will light the yellow light for the thirty-five to forty-five mile zone, and still further speed will actuate the blue light for a forty-five to sixty mile zone and still further speed will actuate the red light for speeds at sixty miles and more, according to the arrangement shown. Of course, it will be readily understood that if desired, the white light could be made to light upon any movement of the car. It is also understood that only one light is lit at a time and that there is no light lit when the car is idle.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent is:

1. In a vehicle, means for indicating the speed of the same to persons outside the vehicle, said means including a plurality of variously colored lights located exteriorly of the vehicle, and means for causing changes in the speed of the vehicle to light different lights to signal the speed of the vehicle, said means including a shaft driven from the transmission of the vehicle, a speed controlled device mounted on the shaft, a contact plunger, said plunger adapted to reciprocate on the shaft and having extensions, channels receiving and guiding said extensions, a series of conductor plates adapted to be selectively contacted by said contact plunger and electric connections between the plates, the plunger and lights so arranged that the plunger will contact different plates at different speeds to selectively light the lights to signal the speed of the vehicle.

2. In a speed indicating device, a plurality of varied colored lights, means for causing changes in the speed of the vehicle to light different lights, said means including a flexible shaft driven from the transmission of the vehicle, a speed controlled shaft driven from the flexible shaft, a movable contact adapted to be operated by the speed of the shaft, guide means for holding the movable contact against rotation, and a series of conductor plates adapted to be selectively engaged by the contact in circuit with the lights for selectively illuminating the latter according to the speed of the vehicle and shaft.

3. In a speed indicating device for automobiles, a transmission driven drive shaft, a speedometer driven thereby, a gear housing, gears in the housing, a stud shaft driven thereby, a housing having a ball governor operated movable contact, a plurality of insulated contacts suspended within the housing and engageable with the movable contact, a signal connected with each of the stationary contacts, a source of electric energy connected to said movable contact, a flexible speedometer shaft detachably connected with the aforesaid shaft through the medium of an intermediate shaft and for interchangeable connection directly with either of said shafts.

4. In combination, a speedometer drive shaft, a stud shaft driven thereby, a flexible shaft, an intermediate shaft adapted for detachable connection with the stud shaft and flexible shaft, a centrifugally operated switch mechanism associated with the intermediate shaft and including an electric circuit having a source of energy, signals and a progressive switch with a series of stationary contacts connected to each signal and a movable contact operated from the intermediate shaft to progressively engage said stationary contacts and having means for indicating car speeds.

EDWARD G. CROFOOT.
FRANKLIN J. LUTZ.